(12) United States Patent
Liu et al.

(10) Patent No.: US 9,107,122 B2
(45) Date of Patent: Aug. 11, 2015

(54) METHOD AND APPARATUS FOR CORRECTING WIRELESS SIGNAL QUALITY

(71) Applicant: Industrial Technology Research Institute, Hsinchu (TW)

(72) Inventors: Chia-Lung Liu, Hsinchu County (TW); Chun-Hao Tseng, Hsinchu (TW); Ming-Chia Lee, Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 299 days.

(21) Appl. No.: 13/757,855

(22) Filed: Feb. 4, 2013

(65) Prior Publication Data

US 2014/0135009 A1  May 15, 2014

(30) Foreign Application Priority Data

Nov. 13, 2012 (TW) .............................. 101142259 A

(51) Int. Cl.
*H04L 1/00* (2006.01)
*H04W 36/00* (2009.01)

(52) U.S. Cl.
CPC .................................. *H04W 36/0083* (2013.01)

(58) Field of Classification Search
None
See application file for complete search history.

(56) References Cited

U.S. PATENT DOCUMENTS

| 6,108,374 | A * | 8/2000 | Balachandran et al. ...... 375/227 |
| 7,493,120 | B2 | 2/2009 | Kim et al. |
| 2002/0056066 | A1 * | 5/2002 | Gesbert et al. ................ 714/759 |
| 2004/0224696 | A1 | 11/2004 | Korneluk et al. |
| 2006/0003768 | A1 | 1/2006 | Chiou |
| 2007/0249355 | A1 | 10/2007 | Kang et al. |
| 2010/0197297 | A1 * | 8/2010 | Hong et al. ................... 455/424 |
| 2011/0188472 | A1 | 8/2011 | Jeon et al. |
| 2011/0195708 | A1 | 8/2011 | Moberg et al. |
| 2011/0281585 | A1 | 11/2011 | Kwon et al. |

(Continued)

FOREIGN PATENT DOCUMENTS

| CN | 101986586 | 3/2011 |
| TW | 201016045 | 4/2010 |

(Continued)

OTHER PUBLICATIONS

Guvenc et al, "Range Expansion and Inter-Cell Interference Coordination (ICIC) for Picocell Networks," IEEE Vehicular Technology Conference (VTC Fall), Sep. 5-8, 2011, pp. 1-6.

(Continued)

*Primary Examiner* — Quan M Hua
(74) *Attorney, Agent, or Firm* — Jianq Chyun IP Office

(57) ABSTRACT

A method and an apparatus for correcting wireless signal quality are provided. The apparatus includes an abnormality detector and a quality adjuster. The abnormality detector collects multiple measurement values reported by a user equipment (UE), calculates a variation degree value according to the measurement values, and compares the variation degree value with a predetermined threshold value. The measurement values are generated by the UE when the UE measures the wireless signal quality of an evolved node B. The measurement values include a first reference signal receiving quality (RSRQ) of the evolved node B. When the variation degree value is larger than the predetermined threshold value, the quality adjuster corrects the first RSRQ based on the measurement values to generate a second RSRQ of the evolved node B.

8 Claims, 5 Drawing Sheets

(56) References Cited

U.S. PATENT DOCUMENTS

| | | | |
|---|---|---|---|
| 2012/0113843 | A1 | 5/2012 | Watfa et al. |
| 2012/0122440 | A1 | 5/2012 | Krishnamurthy et al. |
| 2012/0252460 | A1* | 10/2012 | Koskinen et al. ............ 455/438 |

FOREIGN PATENT DOCUMENTS

| | | |
|---|---|---|
| TW | 201215184 | 4/2012 |
| TW | 201225552 | 6/2012 |
| TW | 201225607 | 6/2012 |
| TW | 201238262 | 9/2012 |

OTHER PUBLICATIONS

Damnjanovic et al., "UE's role in LTE Advanced Heterogeneous Networks," IEEE Communications Magazine, Feb. 2012, pp. 164-176.

Barbieri et al., "LTE Femtocells: System Design and Performance Analysis," IEEE Journal on Selected Areas in Communications 30 (3), Apr. 2012, pp. 586-594.

Bhat et al., "LTE-Advanced: An Operator Perspective," IEEE Communications Magazine, Feb. 2012, pp. 104-114.

Barbieri et al., "Coordinated Downlink Multi-Point Communications in Heterogeneous Cellular Networks," Information Theory and Applications Workshop (ITA), Feb. 5-10, 2012, pp. 7-16.

Yang et al., "Approaches to Enhancing Autonomous Power Control at Femto under Co-channel Deployment of Macrocell and Femtocell," IEEE 22nd International Symposium on Personal, Indoor and Mobile Radio Communications (PIMRC), Sep. 11-14, 2011, pp. 71-75.

Gu et al., "Mobility-Based Handover Decision Mechanism to Relieve Ping-Pong Effect in Cellular Networks," 16th Asia-Pacific Conference on Communications (APCC), Oct. 31-Nov. 3, 2010, pp. 487-491.

Tamea et al., "A Probability based Vertical Handover Approach to Prevent Ping-Pong Effect," 6th International Symposium on Wireless Communication Systems, Sep. 7-10, 2009, pp. 181-185.

Inzerilli et al., "A Location-based Vertical Handover algorithm for limitation of the ping-pong effect," IEEE International Conference on Wireless and Mobile Computing, Networking and Communication, Oct. 12-14, 2008, pp. 385-389.

Wang et al., "Optimized Fairness Cell Selection for 3GPP LTE-A Macro-Pico HetNets," IEEE Vehicular Technology Conference (VTC Fall), Sep. 5-8, 2011, pp. 1-5.

Kurjenniemi et al., "Inter-Frequency Re-Selection for CSG Cell Interference Avoidance in LTE Network," IEEE 71st Vehicular Technology Conference (VTC 2010-Spring), May 16-19, 2010, pp. 1-5.

"Office Action of Taiwan Counterpart Application", issued on Oct. 7, 2014, pp. 1-5, in which the listed references were cited.

* cited by examiner

METHOD AND APPARATUS FOR CORRECTING WIRELESS SIGNAL QUALITY

CROSS-REFERENCE TO RELATED APPLICATION

This application claims the priority benefit of Taiwan application serial no. 101142259, filed on Nov. 13, 2012. The entirety of the above-mentioned patent application is hereby incorporated by reference herein and made a part of this specification.

TECHNICAL FIELD

The disclosure relates to a method and an apparatus for correcting reference signal receiving quality (RSRQ).

BACKGROUND

A long term evolution (LTE) technique and an LTE-advanced (LTE-A) technique belong to a next generation wireless communication network. Newly provided enhanced inter-cell interference coordination (eICIC) of the LTE-A under a heterogeneous network (HetNet) mixing with high power evolved nodes B (eNBs) and low power eNBs is a mechanism capable of revolving a co-channel interference between the high power eNBs and the low power eNBs in the HetNet, and a principle thereof is that the high power eNBs and the low power eNBs can use an almost blank subframe (ABS) mechanism to avoid the co-channel interference.

In the LTE-A system, a user equipment (UE) probably detects signals of a plurality of eNBs, simultaneously, and one of the eNBs provides a wireless communication service to the UE, and such eNB is referred to as a serving eNB, and the other eNBs are referred to as neighboring eNBs. The UE measures a reference signal receiving quality (RSRQ) of each of the neighboring eNBs, and reports the same to the serving eNB, and the serving eNB determines whether to hand over the UE.

The RSRQ of one eNB is proportional to a reference signal receiving power (RSRP) of the eNB measured by the UE divided by a received signal strength indicator (RSSI). Since the eNB does not transmit date when it uses the ABS, a total power average (including a noise power) in a frequency band is decreased, and the RSSI is accordingly decreased, which may results in a fact that the RSRQ reported to the serving eNB by the UE is greater than an actual value, and causes an abnormal handover operation. For example, when the serving eNB uses the ABS, it probably mistakes that it has higher RSRQ, and determines not to hand over the UE. When the neighboring eNB uses the ABS, the serving eNB probably mistakes that the neighboring eNB has higher RSRQ, and incorrectly performs the handover.

A $3^{rd}$ generation partnership project (3GPP) provides a solution of the above problem for the UE of the LTE-A, though the UE of the LTE cannot use such solution.

SUMMARY

The disclosure is directed to a method and an apparatus for correcting wireless signal quality, which is used in a long term evolution (LTE)-A network to detect a measurement error of LTE user equipment (UE) on reference signal receiving quality (RSRQ), and correct the same to avoid error handover.

The disclosure provides a method for correcting wireless signal quality, which includes following steps. A plurality of measurement values reported by a user equipment (UE) are collected, where the measurement values are generated by the UE when the UE measures wireless signal quality of an evolved node B (eNB), and the measurement values include a first reference signal receiving quality (RSRQ) of the eNB. A variation degree value is calculated according to the measurement values. When the variation degree value is greater than a predetermined threshold value, the first RSRQ is corrected according to the measurement values to generate a second RSRQ of the eNB.

The disclosure provides an apparatus for correcting wireless signal quality. The apparatus includes an abnormality detector and a quality adjuster. The abnormality detector collects multiple measurement values reported by a user equipment (UE), calculates a variation degree value according to the measurement values, and compares the variation degree value with a predetermined threshold value, where the measurement values are generated by the UE when the UE measures the wireless signal quality of an evolved node B (eNB), and the measurement values include a first reference signal receiving quality (RSRQ) of the eNB. When the variation degree value is greater than the predetermined threshold value, the quality adjuster corrects the first RSRQ according to the measurement values to generate a second RSRQ of the eNB.

In order to make the aforementioned and other features and advantages of the disclosure comprehensible, several exemplary embodiments accompanied with figures are described in detail below.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DETAILED DESCRIPTION OF DISCLOSED EMBODIMENTS

Figure 1:
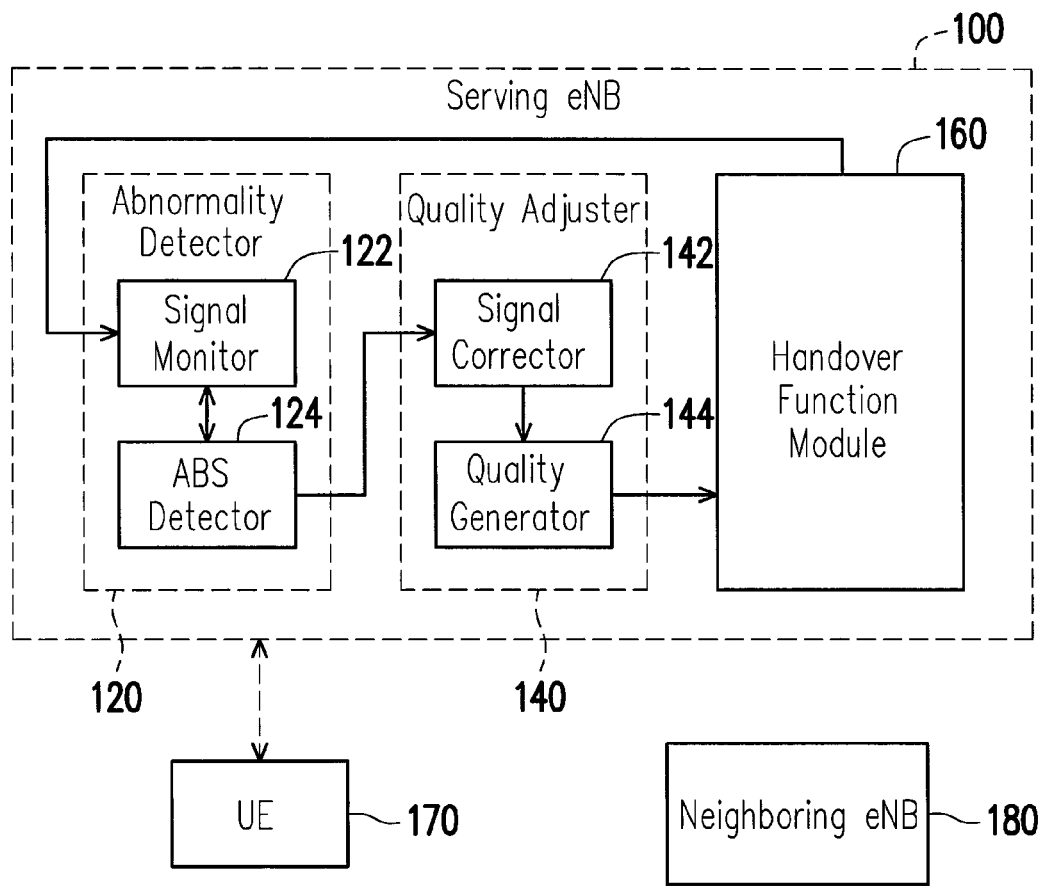
FIG. 1 is a schematic diagram of an apparatus for correcting wireless signal quality according to an embodiment of the disclosure.

FIG. 1 is a schematic diagram of an apparatus for correcting wireless signal quality 100 according to an embodiment of the disclosure. The apparatus for correcting wireless signal quality 100 can be a serving evolved node B (eNB) of user equipment (UE) 170. The UE 170 can detect wireless signals of the serving eNB 100 and a neighboring eNB 180. The serving eNB 100 and the neighboring eNB 180 support long term evolution (LTE) and LTE-A. The UE 170 can be a mobile communication device supporting the LTE.

The apparatus for correcting wireless signal quality 100 includes an abnormality detector 120, a quality adjuster 140 and a handover function module 160. The abnormality detector 120, the quality adjustor 140 and the handover function module 160 can be implemented by hardware or software. The abnormality detector 120 includes a signal monitor 122 and an almost blank subframe (ABS) detector 124. The quality adjustor 140 includes a signal corrector 142 and a quality generator 144. The signal monitor 122 is coupled to the handover function module 160, the ABS detector 124 is coupled to the signal monitor 122, the signal corrector 142 is coupled to the ABS detector 124, the quality generator 144 is coupled to the signal corrector 142, and the handover function module 160 is coupled to the quality generator 144.

Figure 2:
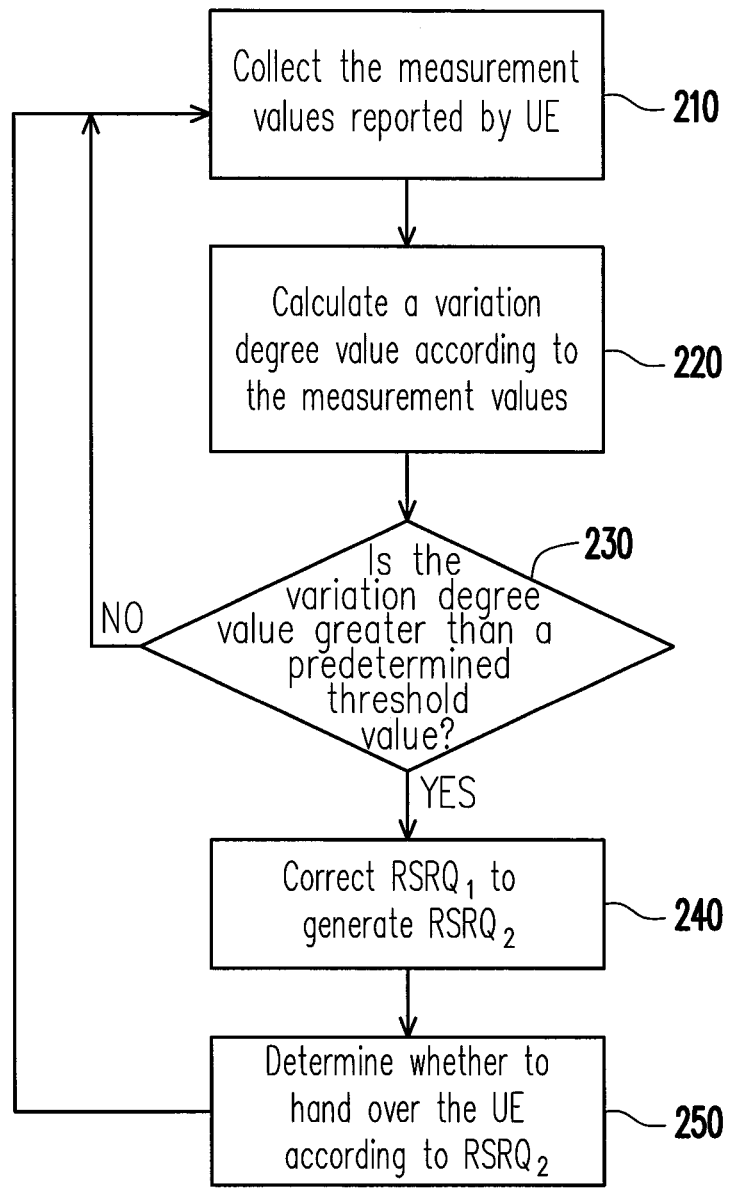
FIG. 2 is a flowchart illustrating a method for correcting wireless signal quality according to an embodiment of the disclosure.

FIG. 2 is a flowchart illustrating a method for correcting wireless signal quality according to an embodiment of the disclosure. The method of FIG. 2 can be executed by the serving eNB 100. First, in step 210, a plurality of measurement values reported by the UE 170 are collected, where the measurement values are generated by the UE when the UE measures the wireless signal quality of an eNB, and the measurement values include a latest reference signal receiving quality (RSRQ) of the measured eNB (the latest measured RSRQ is referred to as $RSRQ_1$). The eNB measured by the UE 170 can be the serving eNB 100 or the neighboring eNB 180.

Then, in step S220, a variation degree value is calculated according to the measurement values. In step 230, it is checked whether the variation degree value is greater than a predetermined threshold value. When the variation degree value is not greater than the predetermined threshold value, it represents that the measured eNB does not use the ABS mechanism, and the $RSRQ_1$ is a correct value, and the flow is returned to the step 210. When the variation degree value is greater than the predetermined threshold value, it represents that the measured eNB uses the ABS mechanism, and the $RSRQ_1$ is required to be corrected, and the flow enters a step 240, by which the $RSRQ_1$ is corrected according to the measurement values to generate corrected RSRQ (which is referred to as $RSRQ_2$) of the measured eNB. Then, in step 250, it is determined whether the UE 170 is required to be handed over according to the $RSRQ_2$.

Figure 3:
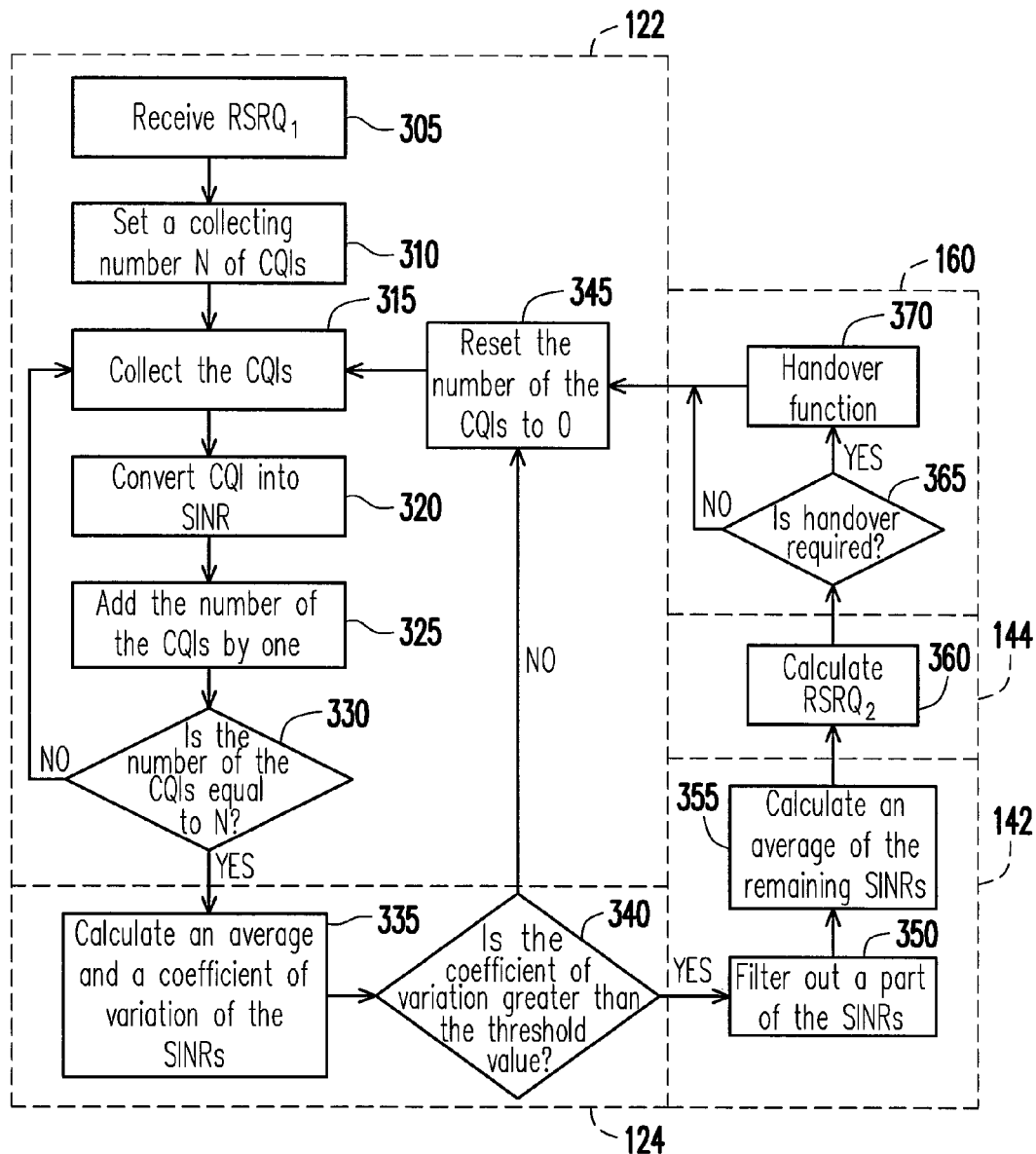
FIG. 3 is a flowchart illustrating a method for correcting wireless signal quality according to another embodiment of the disclosure.
Figure 4:
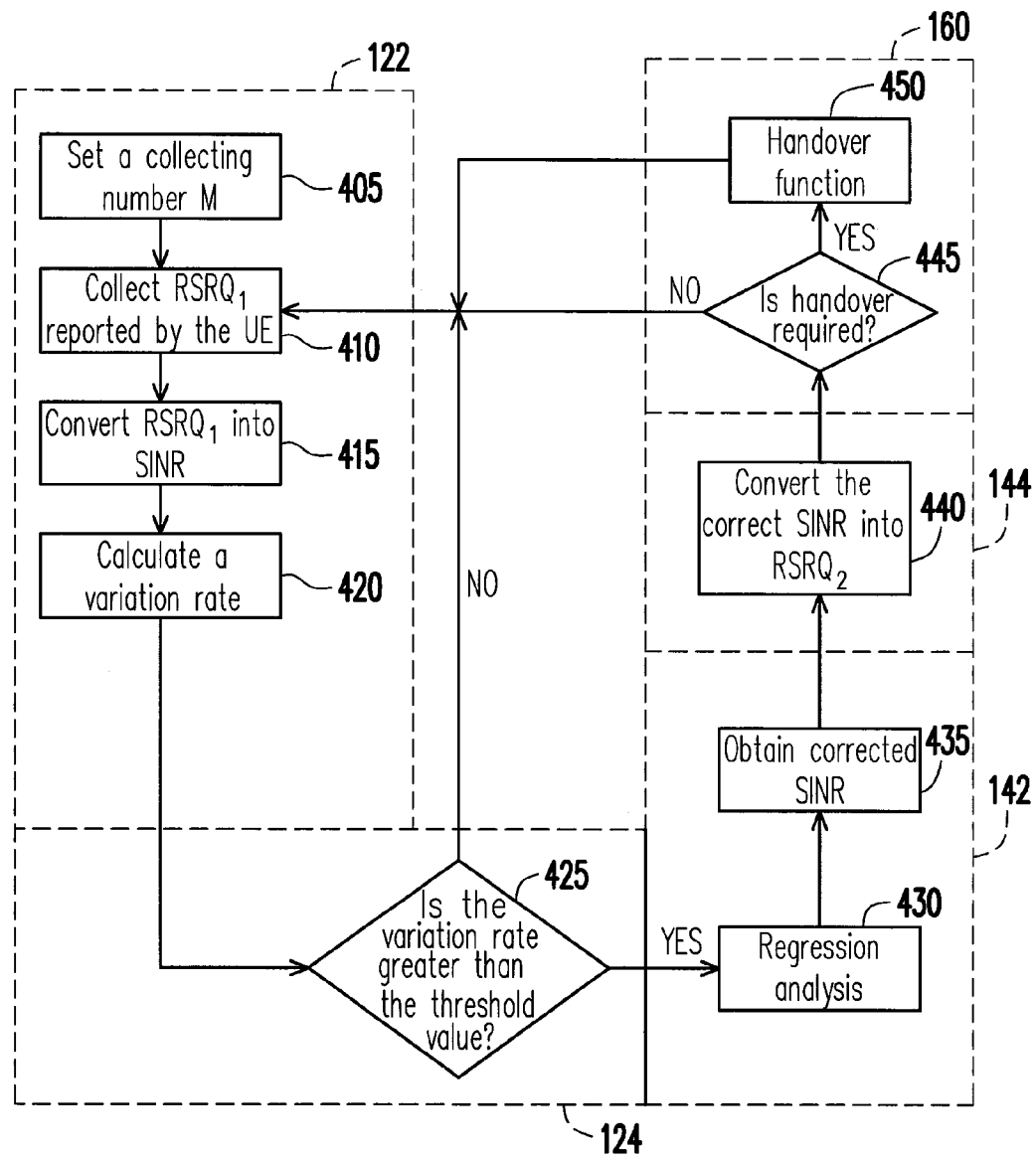
FIG. 4 is a flowchart illustrating a method for correcting wireless signal quality according to another embodiment of the disclosure.

The method of FIG. 2 has two variations shown in FIG. 3 and FIG. 4. FIG. 3 is a flowchart illustrating a method for correcting wireless signal quality according to another embodiment of the disclosure. The method of FIG. 3 can be executed by the serving eNB 100, where the signal monitor 122 executes steps 305 to 330 and a step 345, the ABS detector 124 executes steps 335 and 340, the signal corrector 142 executes steps 350 and 355, the quality generator 144 executes a step 360, and the handover function module 160 executes steps 365 and 370.

In the method of FIG. 3, the $RSRQ_1$ and a channel quality indicator (CQI) reported by the UE 170 are collected to serve as the aforementioned measurement values. The UE supporting the LTE periodically measures the CQI of the serving eNB, and periodically measures RSRQ of each of the neighboring eNBs, and reports these measurement values to the serving eNB, so that the method of FIG. 3 can use such original reporting mechanism. In the method of FIG. 3, the eNB measured by the UE is the serving eNB 100. The method of FIG. 3 can be used to correct the RSRQ of the serving eNB to avoid error handover.

The method flow of FIG. 3 is described blow. In step 305, the $RSRQ_1$ reported to the serving eNB 100 by the UE 170 is collected. In step 310, a collecting number N of the CQIs is set, where N is a positive integer. The signal monitor 122 can first set a time length W to serve as a time length for collecting the CQIs, and set N to be W/P, where P is a period that the UE 170 reports the CQIs. According to the LTE standard, a minimum period of P in a time-division duplex (TDD) system is 1 millisecond (ms), and a minimum period of P in a frequency-division duplex (FDD) system is 2 ms. In the present embodiment, W is greater than or equal to an ABS pattern size of the serving eNB, and is smaller than or equal to a period that the UE 170 reports the $RSRQ_1$.

Then, in step 315, a next CQI reported by the UE 170 is collected. In step 320, the CQI is converted into a corresponding signal to interference plus noise ratio (SINR) by looking up a lookup table. The eNBs supporting the LTE all have such lookup table, which can be applied to the conversion of the step 320. In step 325, the number of the collected CQIs is added by one. In step 330, it is checked whether the number of the collected CQIs is equal to N. If the number of the collected CQIs is smaller than N, the flow is returned to the step 315, if the number of the collected CQIs is equal to N, the flow enters the step 335, by which an average $\overline{SINR_1}$ of a plurality of SINRs converted from the CQIs and a coefficient of variation CV are calculated. The coefficient of variation CV is equivalent to the variation degree value in the flow of FIG. 2.

In order to calculate the coefficient of variation CV, a following equation (1) can be used to calculate a standard deviation s of the SINRs, and a following equation (2) is used to calculate the coefficient of variation CV:

$$s = \sqrt{\frac{\sum (SINR_i - \overline{SINR_1})^2}{N-1}} \quad (1)$$

$$CV = \frac{s}{\overline{SINR_1}} \quad (2)$$

Where the $SINR_i$ in the equations (1) and (2) are the SINRs converted from the CQIs. The SINRs are all values, which can be directly used in the equation (1).

Then, in step 340, the coefficient of variation CV is compared with the predetermined threshold value. When the coefficient of variation CV is not greater than the predetermined threshold value, it represents that the serving eNB does not use the ABS mechanism, and the $RSRQ_1$ is a correct value, and the flow is enter the step 345, by which the number of the collected CQIs is reset to 0, and the flow returns to the step 315. When the coefficient of variation CV is greater than the predetermined threshold value, it represents that the serving eNB uses the ABS mechanism, and the $RSRQ_1$ is required to be corrected, and the flow enters the step 350. Determination of the step 340 is performed since the CQI and SINR is overestimated due to the ABS.

Then, in the step 350, a part of the SINRs is filtered out according to a predetermined condition. Such predetermined condition is to filter out the SINRs greater than the average $\overline{SINR_1}$. In the step 355, an average $\overline{SINR_2}$ of the remaining SINRs is calculated. In step 360, the $RSRQ_2$, i.e. the correct RSRQ of the serving eNB 100 is calculated according to a following equation (3):

$$RSRQ_2 = RSRQ_1 \times \left[\frac{\overline{SINR_1}+1}{\overline{SINR_1}} \times \frac{\overline{SINR_2}}{\overline{SINR_2}+1}\right] \quad (3)$$

The equation (3) can be deduced according to the LTE standard. The equation (3) has to be calculated in a power unit of milliwatt (mW). Since the UE 170 reports the RSRQs in values, the $RSRQ_1$ can be directly used in the equation (3).

Then, in step 365, it is determined whether the UE 170 is required to be handed over according to the RSRQ$_2$. If the handover is required, the flow enters the step 370 to execute the handover function of the LTE standard, and then the flow is returned to the step 345. If the handover is not required, the flow is directly returned back to the step 345.

FIG. 4 is a flowchart illustrating a method for correcting wireless signal quality according to another embodiment of the disclosure. As described above, the method of FIG. 4 is another variation of FIG. 2. The method of FIG. 4 can be executed by the serving eNB 100, where the signal monitor 122 executes steps 405 to 420, the ABS detector 124 executes a steps 425, the signal corrector 142 executes steps 430 and 435, the quality generator 144 executes a step 440, and the handover function module 160 executes steps 445 and 450.

In the method of FIG. 4, latest M RSRQs reported by the UE 170 are collected to serve as the measurement values of the flow of FIG. 2, where M is a positive integer, and the RSRQ$_1$ is one of the M RSRQs with a latest reporting time. As described above, the UE supporting the LTE periodically measures the RSRQ of each of the neighboring eNBs, and reports these measurement values to the serving eNB, so that the method of FIG. 4 can use such original reporting mechanism. In the method of FIG. 4, the eNB measured by the UE is the serving eNB 100 or the neighboring eNB 180. Namely, the method of FIG. 4 can be used to correct the RSRQ of the serving eNB or the neighboring eNB to avoid error handover.

The method flow of FIG. 4 is described below. In the step 405, a collecting number M of the RSRQs is set. The serving eNB only maintains the latest collected M RSRQs. In the step 410, a next RSRQ, i.e. RSRQ$_1$ reported by the UE 170 is collected. As described above, the RSRQ$_1$ can be RSRQ of the serving eNB or the neighboring eNB 180. In the step 415, a following equation (4) is used to convert the RSRQ$_1$ into the SINR. The equation (4) can be deduced according to the LTE standard.

$$SINR = \frac{RSRQ}{1 - RSRQ} \quad (4)$$

Then, in the step 420, a variation rate VR(t) between two of the SINRs is calculated according to a following equation (5), where the variation rate VR(t) is the variation degree value mentioned in the flow of FIG. 2.

$$VR(t) = \frac{SINR(t) - SINR(t - \Delta t)}{\Delta t} \quad (5)$$

In the equation (5), t is a current time, and Δt is a period that the UE 170 reports the RSRQ.

Then, in the step 425, it is checked whether the variation rate VR(t) is greater than a predetermined threshold value. Since usage of the ABS leads to abnormal increase of the RSRQ, if the variation rate VR(t) is greater than the predetermined threshold value, it represents that the measured eNB uses the ABS, and the flow enters the step 430. If the variation rate VR(t) is not greater than the predetermined threshold value, it represents that the measured eNB does not use the ABS, and the flow is returned to the step 410.

Then, in the step 430, a regression analysis is used to obtain a function according to reporting time of a plurality of the RSRQs and the SINRs. The regression analysis can be linear regression, nonlinear regression, polynomial regression or other regressions. In the regression analysis, the other M−1 SINRs besides the latest SINR in the M SINRs are taken as dependent variables of the regression analysis, and the reporting time of the M−1 SINRs are taken as independent variables of the regression analysis. Since the latest SINR is incorrect and is required to be corrected, it is not included in the above regression analysis.

Then, in the step 435, the reporting time of the latest RSRQ$_1$ is input to the above function to obtain the corrected SINR, i.e. the SINR corresponding to the correct RSRQ.

Figure 5:
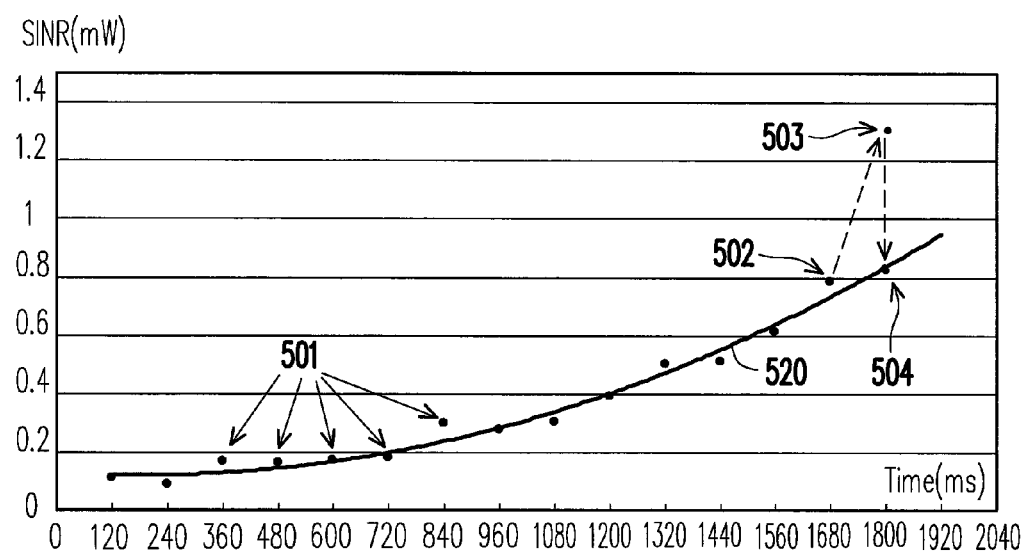
FIG. 5 is a schematic diagram of correcting SINR according to an embodiment of the disclosure.

FIG. 5 is a schematic diagram of correcting SINR according to an embodiment of the disclosure, which is an example of the steps 430 and 435. FIG. 5 illustrates SINRs converted according to a plurality of RSRQs reported to the serving eNB by the UE 170, and in this example, a period that the UE 170 reports the RSRQs is 120 milliseconds (ms), and the SINRs are indicated by black dots, for example, 501-504.

The SINR 502 is equivalent to SINR(t−Δt) in the equation (5), and the SINR 503 is equivalent to SINR(t) in the equation (5). Since the eNB measured by the UE 170 uses the ABS, the variation rate VR(t) is greater than the predetermined threshold value, the flow enters the step 430, by which the regression analysis is used to obtain a function 520. In the step 435, the reporting time of 1800 ms of the SINR 503 is input to the function 520 to obtain the corrected SINR 504.

Then, in the step 440, the corrected SINR is converted into the correct RSRQ$_2$ according to a following equation (6), and the equation (6) can be deduced according to the LTE standard:

$$RSRQ = \frac{SINR}{1 + SINR} \quad (6)$$

Then, in the step 445, it is determined whether the UE 170 is required to be handed over according to the RSRQ$_2$. If the handover is required, the flow enters the step 450 to execute the handover function of the LTE standard, and then, the flow is returned to the step 410. If the handover is not required, the flow is directly returned to the step 410.

In summary, the method and apparatus for correcting wireless signal quality of the disclosure can be applied in the LTE-A wireless communication network to detect signal quality measurement error of the LTE UE and correct the same to avoid error handover. Therefore, the method and apparatus for correcting wireless signal quality of the disclosure can increase communication quality and decrease unevenness of system load.

It will be apparent to those skilled in the art that various modifications and variations can be made to the structure of the disclosure without departing from the scope or spirit of the disclosure. In view of the foregoing, it is intended that the disclosure cover modifications and variations of this disclosure provided they fall within the scope of the following claims and their equivalents.

What is claimed is:

1. A method for correcting wireless signal quality, comprising:
    collecting a plurality of measurement values reported by a user equipment, wherein the measurement values are generated by the user equipment when the user equipment measures wireless signal quality of an evolved node B, and the measurement values comprise a first reference signal receiving quality of the evolved node B;
    calculating a variation degree value according to the measurement values; and correcting the first reference signal receiving quality according to the measurement values to generate a second reference signal receiving quality of the evolved node B when the variation degree value is greater than a predetermined threshold value, wherein the evolved node B is a serving evolved node B or a neighboring evolved node B of the user equipment, the measurement values comprise a plurality of reference signal receiving qualities of the evolved node B, and the first reference signal receiving quality is one of the reference signal receiving qualities with a latest reporting time, wherein the step of calculating the variation degree value comprises:

converting the reference signal receiving qualities into a plurality of signal to interference plus noise ratios; and calculating a variation rate of the latest two signal to interference plus noise ratios, wherein the variation degree value is the variation rate.

2. The method for correcting wireless signal quality as claimed in claim 1, further comprising:

determining whether the user equipment is required to be handed over according to the second reference signal receiving quality.

3. The method for correcting wireless signal quality as claimed in claim 1, wherein the step of correcting the first reference signal receiving quality comprises:

using a regression analysis to obtain a function according to reporting time of the reference signal receiving qualities and the signal to interference plus noise ratios;

inputting a reporting time of the first reference signal receiving quality into the function to obtain a corrected signal to interference plus noise ratio; and converting the corrected signal to interference plus noise ratio into the second reference signal receiving quality.

4. The method for correcting wireless signal quality as claimed in claim 3, wherein the step of using the regression analysis comprises:

taking the other signal to interference plus noise ratios besides the latest signal to interference plus noise ratio in the signal to interference plus noise ratios as dependent variables of the regression analysis; and taking reporting time of the other signal to interference plus noise ratios as independent variables of the regression analysis.

5. An apparatus for correcting wireless signal quality, comprising:

an abnormality detector, collecting a plurality of measurement values reported by user equipment, calculating a variation degree value according to the measurement values, and comparing the variation degree value with a predetermined threshold value, wherein the measurement values are generated by the user equipment when the user equipment measures wireless signal quality of an evolved node B, and the measurement values comprise a first reference signal receiving quality of the evolved node B, wherein the abnormality detector is a first processor of the apparatus for correcting wireless signal quality; and a quality adjuster, coupled to the abnormality detector, and correcting the first reference signal receiving quality according to the measurement values to generate a second reference signal receiving quality of the evolved node B when the variation degree value is greater than the predetermined threshold value, wherein the quality adjuster is a second processor of the apparatus for correcting wireless signal quality, wherein the evolved node B is a serving evolved node B or a neighboring evolved node B of the user equipment, the measurement values comprise a plurality of reference signal receiving qualities of the evolved node B, and the first reference signal receiving quality is one of the reference signal receiving qualities with a latest reporting time, wherein the abnormality detector comprises:

a signal monitor, converting the reference signal receiving qualities into a plurality of signal to interference plus noise ratios, and calculating a variation rate of the latest two signal to interference plus noise ratios; and an almost blank subframe detector, coupled between the signal monitor and the quality adjustor, comparing the variation rate with the predetermined threshold value, wherein the variation degree value is the variation rate.

6. The apparatus for correcting wireless signal quality as claimed in claim 5, further comprising:

a handover function module, coupled to the quality adjuster, and determining whether the user equipment is required to be handed over according to the second reference signal receiving quality.

7. The apparatus for correcting wireless signal quality as claimed in claim 5, wherein the quality adjuster comprises:

a signal corrector, using a regression analysis to obtain a function according to reporting time of the reference signal receiving qualities and the signal to interference plus noise ratios, and inputting a reporting time of the first reference signal receiving quality into the function to obtain a corrected signal to interference plus noise ratio; and a quality generator, coupled to the signal corrector, and converting the corrected signal to interference plus noise ratio into the second reference signal receiving quality.

8. The apparatus for correcting wireless signal quality as claimed in claim 7, wherein the signal corrector takes the other signal to interference plus noise ratios besides the latest signal to interference plus noise ratio in the signal to interference plus noise ratios as dependent variables of the regression analysis, and takes reporting time of the other signal to interference plus noise ratios as independent variables of the regression analysis.

* * * * *